United States Patent
Myers et al.

(10) Patent No.: US 6,304,762 B1
(45) Date of Patent: Oct. 16, 2001

(54) POINT TO MULTIPOINT COMMUNICATION SYSTEM WITH SUBSECTORED UPSTREAM ANTENNAS

(75) Inventors: William K. Myers, McKinney; Eugene A. Robinson, Dallas; Hatcher E. Chalkley, Carrollton; Michael L. Brobston, Allen; Douglas B. Weiner, The Colony, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/996,258

(22) Filed: Dec. 22, 1997

Related U.S. Application Data

(60) Provisional application No. 60/034,342, filed on Dec. 23, 1996.

(51) Int. Cl.[7] .................................................... H04B 1/38
(52) U.S. Cl. ........................ 455/562; 455/422; 455/447
(58) Field of Search .................................. 455/422, 424, 455/449, 517, 524, 561, 562, 62, 63, 67.1, 447, 446; 343/824, 853

(56) References Cited

U.S. PATENT DOCUMENTS

| | | | |
|---|---|---|---|
| 4,747,160 | * 5/1988 | Bossard | 455/33 |
| 5,095,535 | * 3/1992 | Freeburg | 455/278 |
| 5,668,610 | * 9/1997 | Bossard et al. | 348/725 |
| 5,684,491 | * 11/1997 | Newman et al. | 342/374 |
| 5,724,666 | * 3/1998 | Dent | 455/562 |
| 5,742,911 | * 4/1998 | Dumbrill et al. | 455/562 |
| 5,771,449 | * 12/1999 | Blasing et al. | 455/422 |
| 5,924,040 | * 7/1999 | Trompower | 455/456 |
| 5,936,578 | * 8/1999 | Driessen et al. | 342/374 |
| 6,006,069 | * 12/1999 | Langston | 455/62 |
| 6,016,320 | * 1/2000 | Welton | 370/442 |

FOREIGN PATENT DOCUMENTS 0 715 478 A    6/1996  (EP) .

* cited by examiner

*Primary Examiner*—Lee Nguyen
(74) *Attorney, Agent, or Firm*—Robert L. Troike; Frederick J. Telecky, Jr.

(57) ABSTRACT

A point-to-multipoint communication system wherein the base station broadcasts the same frequency band signals over multiple sectors of given node. The base station includes a plurality of channel receivers (ch. 1–ch. n) for each sector and a plurality of antennas 36a and 36b selectively coupled to said channel receivers. The subsector antennas have these radiation centers offset from each other to present different coverage over the node.

19 Claims, 4 Drawing Sheets

POINT TO MULTIPOINT COMMUNICATION SYSTEM WITH SUBSECTORED UPSTREAM ANTENNAS

This application claims the priority of provisional application Ser. No. 60/034,342 filed Dec. 23, 1996.

TECHNICAL FIELD OF THE INVENTION

This invention relates to communications systems and more particularly to two way point to multipoint system with frequency reuse.

BACKGROUND OF THE INVENTION

Communication systems operating over a wide range of frequencies, modulation techniques, multiplexing techniques, error correction techniques, protocols, and network topologies are known in the state of the art. Many recent papers have described numerous techniques for wireless transmission of two way, switched narrow band services and in addition there has been proposed some form of television distribution or communication distribution utilizing devices in the millimeter wave frequency band, which is between 27 GHz and 300 GHz using short range cellular transmitters covering small areas. These small areas are covered by the short range and serviced by the cellular base station transmitters which may be fed by, for example, an underground cable in the same manner as cellular radio. This distribution may also be made using microwaves converted at the local base stations to millimeter waves for local distribution. Distribution to millimeter waves stations may also be done by a fiber optics system or a satellite distribution system.

A discussion of millimeter wave stations appears in IEEE Spectrum of June, 1982, pages 54–59, entitled, "low power television short range low cost TV stations are in the offering as the FCC prepares to establish broadcast requirements". A U.S. Pat. No. 4,747,160 entitled "Low Power Multi-Function Cellular Television System" of Bossard describes a low power, point to multipoint cellular television system operating in a 27.5 to 29.5 gigahertz frequency band using omni directional antennas. A 29 GHz-2 point radio system for local distribution is described, for example, in the *British Telecom Technical Journal*, Volume 2, No. 1, January 1984, entitled, "29 Gigahertz-2 Point Radio Systems for Local Distributions" by S. A. Mohamed and M. Pilgrim. A low power, short range point to multipoint communication system of Langston is described in U.S. Pat. No. 6,006,089 originally filed Nov. 28, 1994. This application describes a system wherein at each node there is located an antenna system for radiating the same frequency signals a plurality of times about each node to provide spectrum reuse within each node location. The system would include subscriber receivers adapted to receive one of the polarized signals and wherein the receiver may reply back. The nodal base station transmitters transmitting the signals would have a receiving antenna system adapted to receive polarized signals from the subscriber. This application is incorporated herein by reference.

Previous two-way point-to-multipoint systems include cellular telephone systems, wireless local loop systems and satellite communication systems. Cellular systems and local loop systems frequently use sectored nodes or hubs but do not reuse the same frequency at a given node or hub. LMDS multipoint systems may use band splitting between sectors or alternating frequency channels between sectors. Satellite systems do not afford sectoring and reuse of frequency because of directivity requirements of the path. No known system is currently using 100% frequency reuse at each sectored node or hub other than that in the above cited Langston application. In a Shindo reference entitled, "Radio Subscriber Loop System for High-Speed Digital Communications," IEEE 1981 International Conference on Communications, pages 66.1.1 to 66.1.5 Vol. 3 in particular on page 66.1.2 under frequency reuse, they cite four frequency sectors a, b, c, and d, and state that in order to reduce the interference areas, polarization diversity or sector diversity shown in FIG. 2(*b*) can be adapted. The four sectors in the nodes are different frequency and are not of alternating polarization. There is no suggestion alternating the polarization about the node as in applicant's above cited application.

In another reference of Murakami, et al. entitled "A Multiple Access Digital Microwave Radio System for Local Subscribers" in the IEEE 1983, IEEE International Conference on Communications: Integrating Communication for World Progress (ICC '83), pages B 2.5(1) to B 2.5(7) (p. 380–6, Vol. 1), there are two or three subchannel frequencies and two polarizations. One-half of the node is at vertical, the other half of the node is at horizontal polarization. In another reference of Manichaikul, et al. entitled, "RAPAC-A Point to Multipoint Digital Radio System for Local Distribution" in the IEEE 1983, IEEE International Conference on Communications: Integrating Communication for World Progress (ICC '83), pages D 4.2.1 to 4.2.4 (p. 1013–16, Vol. 2), frequency reuse includes changing polarization as well. There are three channel frequency bands (A, B, and C) over the nodes. The polarization of the channels frequencies in the adjacent nodes is changed. This is found on page D.4.2.3.

The point-to-multipoint communication system of Langston application provides service to a large number of subscribers in each node. The upstream signals from the shared frequencies between subscribers located in adjacent sectors incur interference, especially when the transmit power levels are unbalanced and when heavy rain cells occur in the desired subcarrier path.

SUMMARY OF THE INVENTION

In accordance one embodiment of the present invention, the receive antenna system at the base station comprises subsector antennas that are offset as to coverage area in sector of the node so the base station receiver can receive from the remote station the remote station signal from the subsector antenna with the best response.

In accordance with another embodiment, one subset of sector frequencies is assigned to one base station subsector receiver and subsector antenna and another subset of sector frequencies is assigned to another base station subsector receiver and subsector antenna.

These and other features of the invention that will be apparent to those skilled in the art from the following detailed description of the invention, taken together with the accompanying drawings.

DESCRIPTION OF PREFERRED EMBODIMENTS

Figure 1:
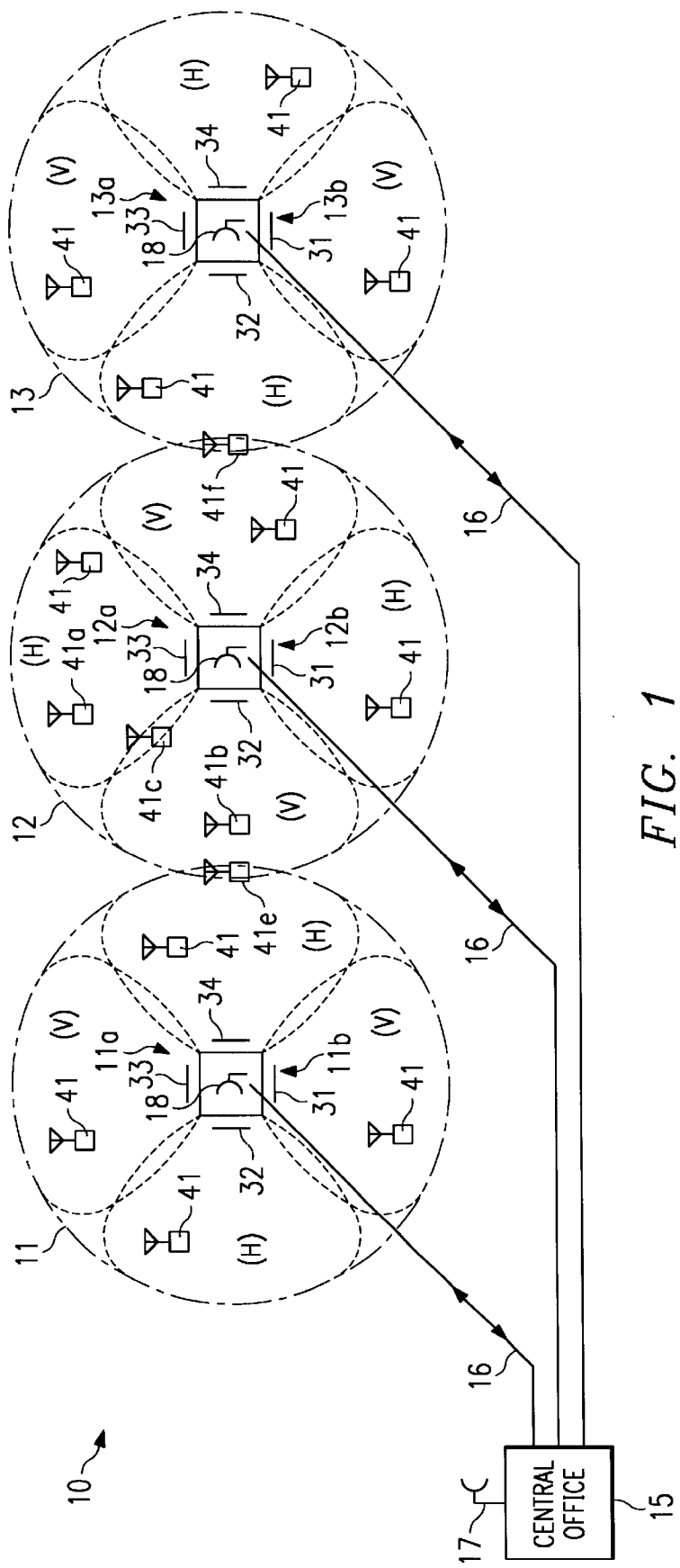
FIG. 1 illustrates the multipoint system according to one embodiment of the present invention.

Referring to FIG. 1, there is illustrated the distribution system network 10. This network comprises a plurality of nodes, such as node 11 through 13 covering a given combined area. For example, this area may cover a few city blocks only, but with hundreds of such nodes the area may comprise an entire large city. A central office 15 would be, for example, the central message center or source of programming for distribution to the other nodes 11 through 13. Each of the nodes would include a nodal broadcast base station transmitter or transmitter and receiver system. This is represented by system 11a, 12a, and 13a in the center of the nodes 11 through 13. The transmission from the central office 15 to the nodal broadcast base station transmitter systems 11a, 12a, or 13a may be done by cabling in or around the city such as fiber optic telephone exchange cables represented here as cable 16 between the central office 15 and the node base station transmitter systems 11a, 12a, and 13a. This coupling may also be done using microwave antennas such as using antenna 17 from the central office 15 communicating with antennas 18 at the center of the nodes at the systems 11a, 12a, or 13a. This distribution may be implemented in a variety of other configurations well known in the state of the art.

Figure 2:
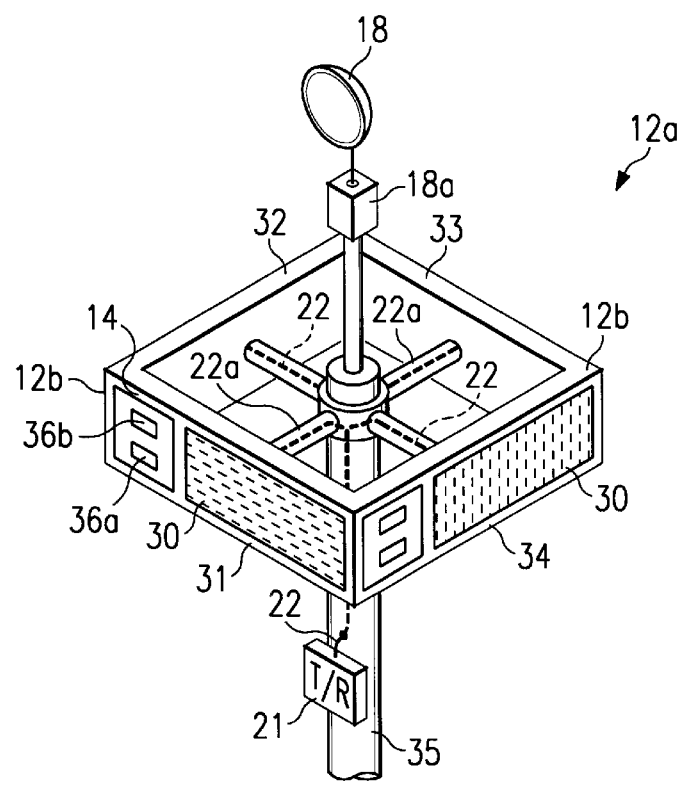
FIG. 2 illustrates a nodal broadcast system in FIG. 1.

Referring to FIG. 2, there is illustrated a sketch of a nodal broadcast base station transmitter or system 12a. In the case of microwave distribution from a central office, there is the microwave antenna represented schematically by 18. The nodal base station transmitter broadcast systems 11a and 13a are like system 12a illustrated in FIG. 2, with the polarizations indicated in the sketches as horizontal polarization and vertical polariation of FIG. 1. (Other orthogonal polarization may preferably be used, e.g., slant 45° and 315° or left and right circular polarization. The system 12a includes a post 35 for supporting a four-quadrant sectorized antenna complex system represented by 12b. The base station system 12a includes a base station transmitter system 21a and base station receiver system 21b represented schematically by 21. Signals transmitted from base station system 12a are coupled from base station transmitter system 21a to the nodal base station transmitter coverage or broadcast antenna system 12b of transmitter/receiver 21 comprised of four panel array antennas 31, 32, 33, and 34 via leads 22. The base station transmitter system 21a comprises four base station transmitter subsystems each transmitting the same frequency band. The panel antennas 31–34 are mounted to post 35 via supports 22a housing transmission lines 22. Each of the panel antenna 31–34 is coupled via the transmission lines 22 to one of the subsystem base station transmitters. Each of these panel antennas 31–34 comprises an array of, for example slot, transmitting antenna elements 30 and pair of horn receiving antenna elements 36a and 36b as will be discussed in more detail later. Polarization of these antenna elements 30 for antenna system 12b is such that panels 31 and 33 for system 12b transmit horizontally polarized waves (marked (H) in FIG. 1), while panels 32 and 34 for system 12b transmit vertically polarized waves (marked (V) slant in FIG. 1). See FIG. 1. System works equally well for slant polarization as cited in above cited patent application or may use right and left circular polarization. The radiators can all be horns or other types of well known radiator elements.

These panel antennas 31–34, for example, produce a 90 degree beam width so that each of the panel antennas 31–34 covers approximately 90 degrees beam width and the polarization from these panel antennas 31–34 alternates orthogonal polarization about the node. That is, for example, from horizontal at panel 31 to vertical at panel 32 to horizontal at panel 33 to vertical at panel 34. For the slant polarization case from 45° to 315° polarization to 45° polarization and then to 315° polarization about the center of the node on post 35. This, therefore, provides a 360 degree pattern about the center of the node where the node broadcast base station transmitter is located. Dielectric polarizer outboard of the elements 30 are used to provide the desired polarization.

The adjacent nodes 11 and 13 on either side of node 12 present orthogonal polarization. For example, the panel antennas 31 and 33 in nodes 11 and 13 produce vertical polarization or for slant polarization −45° (315°) polarized signals and the panel antennas 32 and 34 in nodes 11 and 13 produce horizontal polarization or for slant polarization +45° polarized signals. Therefore, at the adjacent sectors of the nodes, that is where node 11 is adjacent to node 12, the polarizations are orthogonal, and where node 12 meets node 13 the polarization is orthogonal. The node broadcast base station transmitting antennas systems 11b, 12b and 13b transmit and communicate with receiving stations 41 scattered in the area of the nodes. While the panel antennas 31–34 broadcast the downstream signals to the receiver stations 41 the horn antennas 36a and 36b receive the upstream signals from the receiver stations 41 to the receiver system 21b of transceiver 21. The pair of horn antennas for receive are adapted to receive for example the same polarization as the downstream signals at on offset frequency band. In accordance with another embodiment, the horn antennas for receive are at the orthogonal polarization.

Receiving station 41 may be located anywhere in any of the nodes 11–13 and will receive the signal radiated from the base station antenna complex at the center of one of the nodes from the sectorized antenna system 20. The receiving station antenna is highly directional both for transmit and receive. For example, the beam width is about 2 degrees. The directional antenna pattern of the receiving station 41 antenna would determine which base station and base station sector it was receiving from and the polarization. The polarization of the receiving station 41 would determine which sector it is receiving from. For example, the receiving station 41a antenna in FIG. 1 in node 12 would be in the horizontal polarized sector and be adapted to receive horizontally polarized signals from the panel antenna 33 of system 12b. Receiving station 41b antenna in node 12 would be adapted to receive preferably vertically polarized signals from the panel antenna 32 and not horizontally polarized signals from panels 31 or 33 from system 12b or from panel 32 of system 13b. For the receiving antenna at station 41c, located in the overlapping area of the pattern of 32 and 33, it is possible to receive both horizontally polarized signals from panel antenna 33 and vertically polarized signals from panel antenna 32. However, a signal received from the face which is of the wrong polarization from the antenna at station 41 would be 20 to 30 dB lower in power than the other face. For example, if the antenna of station 41c was vertically polarized it would receive the signal from panel antenna horizontally polarized 33 of system 12b from 20 to 30 dB down from that of the vertically polarized signal from antenna 32 of system 12b. The receiver stations 41 would have a directional antenna and therefore obtain directivity and isolation by pointing to the desired base station node.

The system is designed such that the signals from all four panels 31–34 are transmitting at the same earlier frequencies in the four sectors but may contain different information. The carrier frequencies are separately modulated by, for example, QPSK modulation. The system is dependent upon space (different coverage areas) as well as frequency and polarization diversity.

The system, as described herein, utilizes a four-quadrant sectorized antenna. However the system could be of any even number of sectors such as two, four, eight, etc. The four-quadrant sectorized antenna discussed in FIG. 1 has an azimuth pattern relatively flat over a plus and minus 45 degrees from the center (90° beam width) which is easy to implement and is, therefore, more easily implemented, for example on a building or a tower for mounting panel antennas. An octagon, or eight sector, antenna system may be practical in some cases.

The transmission to and from the central office 15, as stated previously, may include a microwave network with the microwave dish 18 coupled to a transceiver via an up/down converter 18a. The received signals from the central office 15 are upconverted to millimeter waves and sent via the panel antennas and the received signals at the panel antennas are down converted to microwave frequencies and sent back to the central office 15 via antenna 18 or cables 16. (Other frequencies, e.g., millimeter frequency, may also be used to interconnect the nodes).

It is highly desired in accordance with the present invention that the elevation angle of the node antenna beam be in the order of 10 degrees. This is achieved in each of the panel antennas by linear arrays of antenna elements as shown in FIGS. 3.

Figure 3:
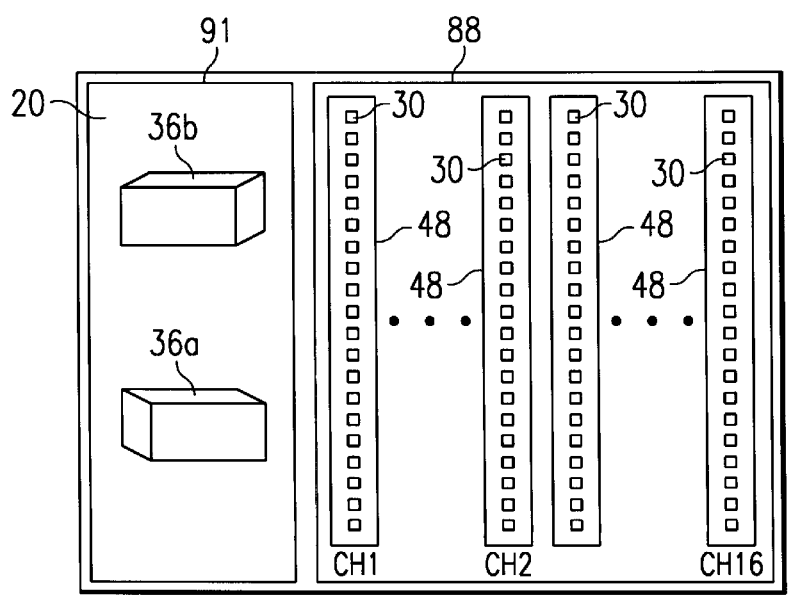
FIG. 3 illustrates one panel antenna in FIG. 2 according to one embodiment of the present invention.

The printed circuit antenna panels 31 and 33 for 12b may each be like that shown in FIG. 3, for example, with 16 linear arrays 48 for 16 transmitter carrier channels (ch1–ch16 for 27.86 GHz to 28.50 GHz or channel 1–16 for 28.50 GHz to 29.5 GHz). Each element of an array represented herein by a square 30 can be either a horizontal or vertical dipole for a horizontal/vertical dipole system or may be slot vertical or horizontal radiators or horns. Each panel antenna 31–34 covers the frequency band from, for example, 27.5 GHz to 28.5 GHz or 28.5 GHz to 29.5 GHZ. In accordance with the preferred embodiment with slot radiators, a polarizer layer 88 (shown in outline in FIG. 3) is placed over the 16 linear arrays 48. The polarizer layer 88 is a dielectric layer shaped to achieved the desired polarization over the desired beam width.

On the left most part of the antenna panels 31–34 are mounted two receiving horn antennas 36a and 36b operating over a frequency band of 27.5–27.64 GHz or 29.38–29.5 GHz. These are used for upstream signals from the remote stations 41. The receiving horns 36a and 36b also can have a polarizer layer 91. The horn receiving pattern is tapered (shaped) to provide the desired pattern. The upstream (or return) link at a point-to-multipoint system requires that many subscriber transmissions from all sectors are received at the same node location. A power control mechanism is implemented so that all signals arrive at the base station node receive. antenna at near equal power levels to minimize adjacent channel interference from the stronger-signal channel to the weaker-signal channel. The common frequency interferer for an upstream signal may be located anywhere in adjacent sectors. When the interferer is located near the sector boundary of the desired subscriber sector, maximum interference occurs. The isolation between common frequency subscriber channels is a function of the cross-polarization rejection of the base station node receive antennas, the side-to-front gain ratio of base station node receive antennas, and the cross-polarization rejection of the interfering subscriber remote station antenna. Other parameters that affect the isolation between common frequency subscriber (remote station) channels are location of the interfering subscriber (remote station), gain differences between adjacent base station node antennas, subscriber (remote station) power control differences, and orthogonal misalignment error between the base station node receive antenna and the interfering subscriber (remote station) antenna. The resulting crosspol interference ratio due to a common frequency interferer is described for the upstream link by Equation 1 below for the case where the misalignment error, β, is small (<5°).

$$\frac{C}{I_x} = \frac{\Delta\varepsilon_p}{\Delta G_{xpol} + \Delta G_{pol} \cdot [I_{cxi} + \sin^2\beta]}$$

The terms of this equation are defined as follows:

The term $\Delta G_{xpol}$ represents the ratio of the cross-polarization gain of the subject sector base station node receive antenna to the co-polarization gain of the adjacent sector base station node receive antenna in the direction of the interfering subscriber (remote station) antenna. The term $\Delta G_{pol}$ represents the ratio of the co-polarization gain of the subject sector base station node receive antenna to that of the adjacent sector base station node receive antenna in the direction of the interfering subscriber (remote station) antenna. The term $I_{cxi}$ represents the cross-polarization isolation of the interfering subscriber (remote station) antenna in the adjacent sector. The term β represents the misalignment (in polarization coordinates) between the interfering antennas and the subject base station node antenna. Finally, the term $\Delta\varepsilon_p$ represents the power control error ratio of the subject link control loop and the interfering link control loop as measured in terms of signal power available at the respective base station node receive antenna terminals.

Figure 4:
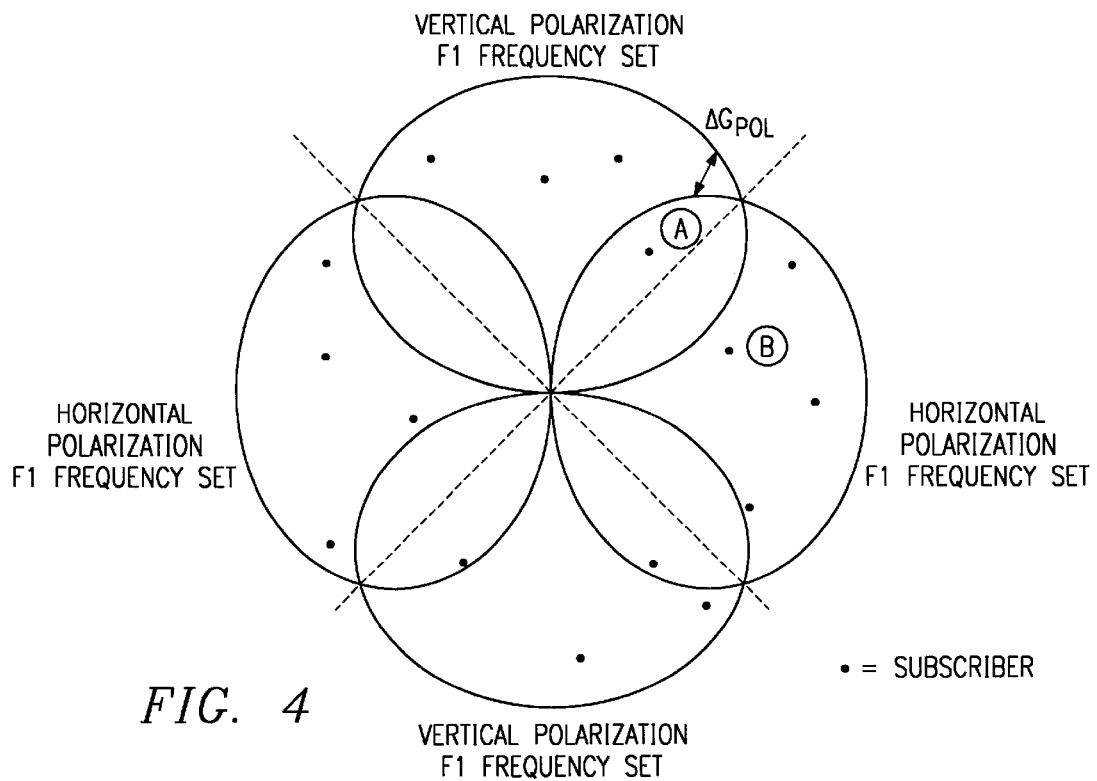
FIG. 4 illustrates a four-sector node with one upstream radiator per sector.

FIG. 4 illustrates a single downstream antenna per base station node sector. The dots represent subscriber (remote) stations 41. Interference from an undesired subscriber "A" with the desired subscriber "B" is greatest when the interfering subscriber A is located where the two sectors intersect. The base station node cross-polarization isolation is the only rejection of crosspol interference at this boundary. Antenna azimuth patterns for the two sector polarizations will not be perfectly matched at this boundary, further degrading isolation. $\Delta G_{pol}$ in the figure is the $\Delta G_{pol}$ term in the above equation.

This interference is increased when a rain cell is present in the desired signal path that causes an increase in the relative amplitude of the interfering signal.

In accordance with the present invention, the upstream subsystem of each antenna 31–34 comprises two separate receive horn antennas 36a and 36b in FIGS. 2 and 3, each having a beam width of, for example, about 45 degrees, with the antenna 36a and 36b offset so their centers of radiation (coverage) are centered at the right and left half of the sectors so that the same coverage is provided by two separate offset antennas 36a and 36b, each covering approximately half of the beam width of the download antenna or half of the sector. This is represented in the FIG. 5 by the heavy solid lines and the light solid lines over the coverage area. Each of these antennas is referred to as a subsector antenna in this application. The beam width could be other than 45 degrees, for example, 60 or 90 degrees but the radiation centers are offset to equally divide the downstream sector. This can be achieved by tilting the horn radiators to the right and left of the center of the sector.

Figure 6:
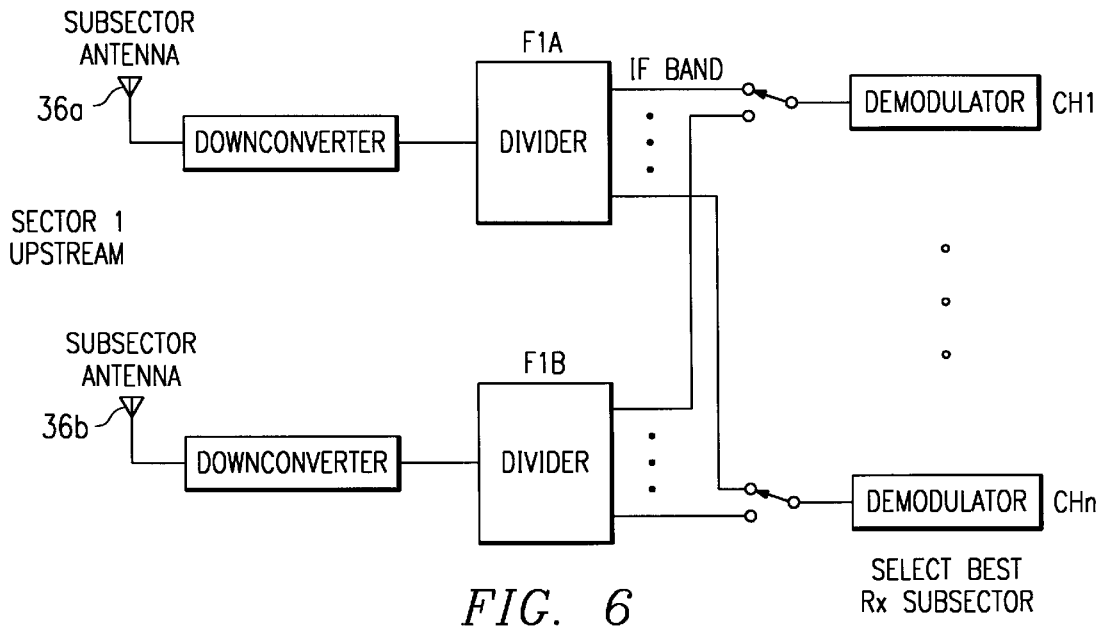
FIG. 6 illustrates spatial diversity receiver for subsector upstream channels.

Referring to FIG. 6, there is illustrated the spatial diversity receiver 21b for upstream channels. All the upstream frequencies are received at both horn antennas 36a and 36b. They are separately downconverted and provided to dividers FIA and FIB. The demodulator of a channel receiver can be switched to receive the best signal from the two subsector antennas 36a or 36b. The switch may be controlled by the channel user or the signal strength detected for that channel from both subsectors is compared and the subsector with the higher level signal is switched into the demodulator by a control signal from a comparator.

Figure 5:
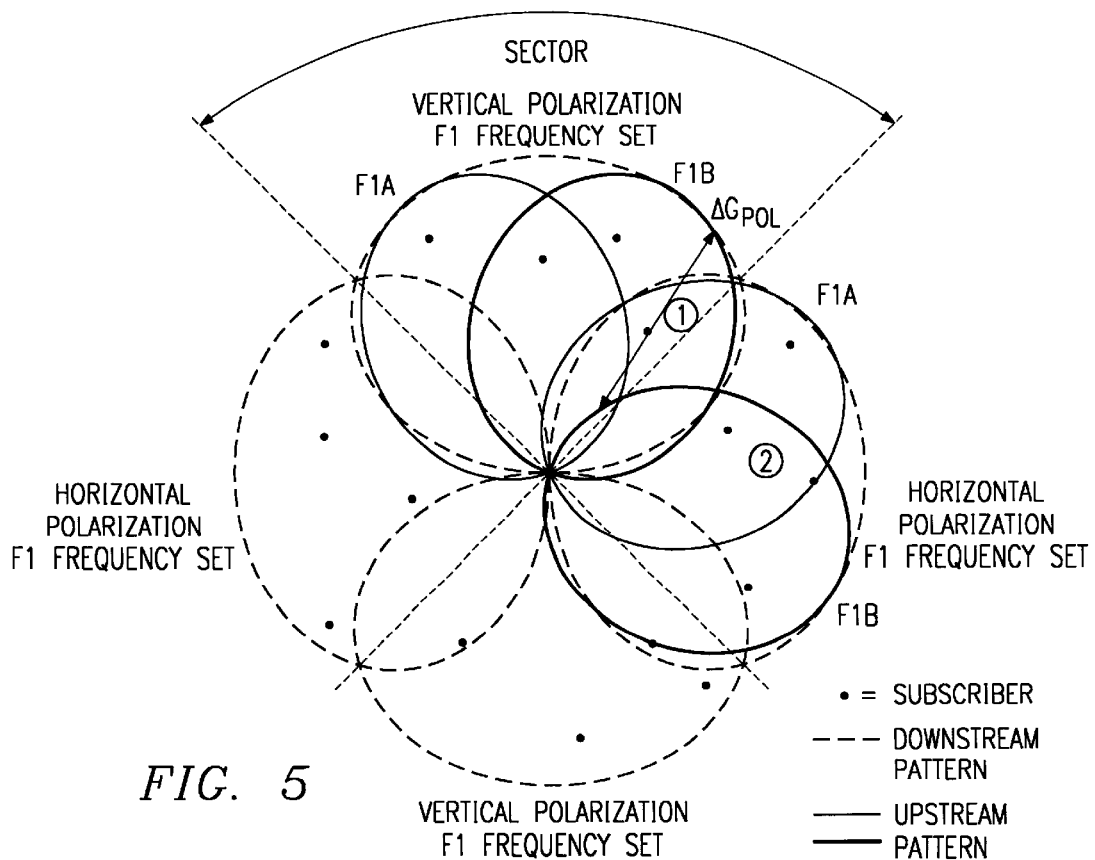
FIG. 5 illustrates the subsector layout with two upstream antennas per sector according to one embodiment of the present invention.
Figure 7:
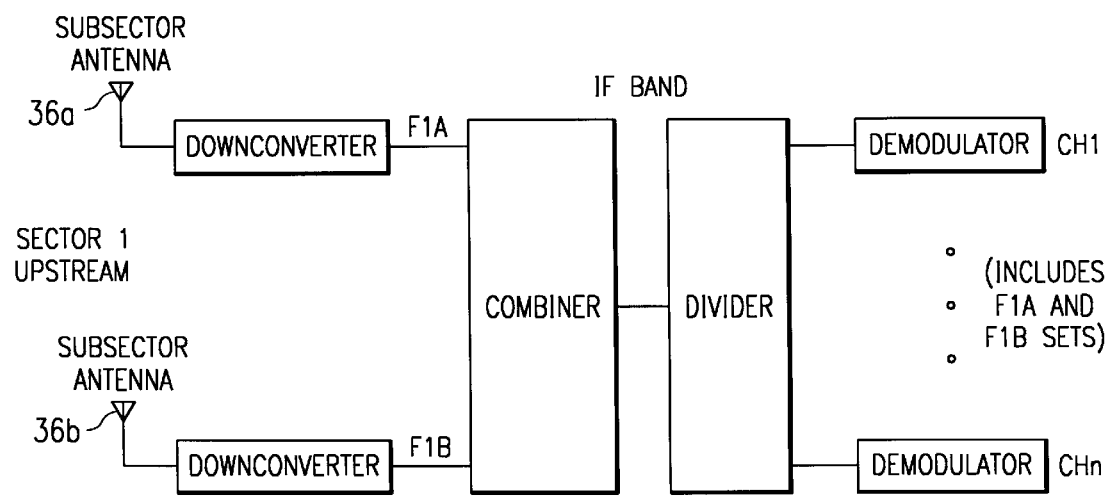
FIG. 7 illustrates upstream layout with dedicated subsector frequencies.

In accordance with another embodiment, the upstream has dedicated subsector frequencies. The geographical ordering of subscriber frequencies is performed at the time of assignment. Each subsector antenna 36a and 36b is connected to demodulators according to frequency. As illustrated in FIG. 5, the FIA frequency set is for the left half of each sector as viewed at the center of the node and the frequency FIB is at the right half of each sector. The upstream frequencies therefore alternate about the node. One sub-set of sector frequencies FIA is assigned to one subsector receiver A and another subset of sector frequencies FIB is assigned to one subsector receiver B. The demodulators can be set for A or B frequencies as desired. This is represented by FIG. 7.

Although the present invention and its advantages have been described in detail, it should be understood that various changes, substitutions and alterations can be made herein without departing from the spirit and scope of the invention as defined by the appended claims.

What is claimed is:

1. A point to multipoint communications system comprising:
a base station nodal transmitter and base station transmit antenna and a base station receiver system and base station receive antenna system located at each node, said base station transmitter and base station transmit antenna broadcasting signals over a given downstream sector of said node;
remote transceiver stations located at the downstream sector of said node capable of receiving said signals from said base station transmitter broadcasting signals over said downstream sector of said node and capable of transmitting polarized return upstream signals to said base station nodal receiver system and base station receive antenna system;
said base station nodal receiver system including one or more receivers for each downstream sector for receiving said return upstream signals from said remote stations;
said base station nodal receive antenna system including a plurality of offset subsector antennas for said given downstream sector of said node such that the center of the coverage area in said downstream sector of each of the antennas is separated and offset to present different coverage over the downstream sector by the offset subsector antennas and said plurality of offset subsector antennas for each given downstream sector are of orthogonal polarization to the plurality of offset subsector antennas for the adjacent downstream sector such that the polarization of the receive antenna system alternates from sector to sector about the node; and
means for selectively coupling said offset subsector antennas of said downstream sector of said node to said one or more base station nodal receivers for each downstream sector.

2. The system of claim 1 wherein said remote transceiver stations include a directional transmit antenna.

3. The system of claim 1 wherein said directional transmit antenna at said remote station has a beam width of less than 5 degrees.

4. The system of claim 3 wherein said offset subsector antennas for each downstream sector are coupled to separate receivers and adapted to receive different receive frequencies.

5. The system of claim 1 wherein said plurality of offset subsector antennas is two and said centers of radiation are centered with a first subsector antenna coverage centered at the left half of the downstream sector and a second subsector antenna coverage centered at the right half of the downstream sector.

6. The system of claim 5 wherein said selective means includes switching the one of the two offset subsector antennas with the best signal to the base station receiver for that sector.

7. The system of claim 6 wherein said selective means includes means for receiving the signal from both offset subsector antennas, and detecting the best signal.

8. The method of claim 7 wherein the means for detecting the best signal includes a comparator comparing both subsector antenna signals signals and the means for selecting includes a switch for switching that is responsive to a control signal from said comparator.

9. The system of claim 1 wherein said selective means includes switching the offset subsector antenna with the best signal in the downstream sector to the base station receiver for that sector.

10. A point to multiunit communications system comprising:
a plurality of base station transmitters and alternating orthogonal polarized sector antennas located at each node broadcasting signals such that the polarization of the downstream signals transmitted about the node from sector to sector of the node changes orthogonal polarization;
polarized remote transceiver stations capable of receiving polarized signals in each sector of the node where the polarization alternates about the node and capable of transmitting polarized return upstream signals back to a base station receiver system at the base station where the polarized upstream signals alternate polarization from sector to sector about the node; said base station receiver system including one or more base station receivers for each downstream sector;
a base station receive antenna system including a plurality of polarized offset subsector antennas for each downstream sector such the center of the coverage area of the subsector antennas at each downstream sector is separated and offset to present different coverage over the downstream sector and the polarization of the plurality of offset subsector antennas for each downstream sector are orthogonal to the plurality of offset subsector antennas for the adjacent downstream sector such that the polarization of the base station receive antennas alternate from sector to sector about the node; and
means for selectively coupling said offset subsector antennas for said downstream sector to said one or more base station receivers for that downstream sector.

11. The system of claim 10 wherein said offset subsector antennas are coupled to separate base station receivers for that sector and adapted to receive different receive frequencies.

12. The system of claim 11 wherein said plurality of offset subsector antennas is two and said centers of radiation are centered with a first subsector antenna adapted to receive a first band of frequencies at the left half of the downstream sector and a second subsector antenna adapted to receive a different second band of frequencies centered at the right half of the downstream sectors and said first subsector antenna is coupled to a first of said base station receivers in said sector and said second subsector is coupled to a second of said base station receivers.

13. The system of claim 10 wherein said plurality of offset subsector antennas is two and said center of radiation of a first subsector antenna is centered at the left of each sector and said center of radiation of a second subsector antenna is centered at the right of each sector.

14. The system of claim 13 wherein said selective means includes switching the one of the two offset subsector antennas with the best signal to the base station receiver for that sector.

15. The system of claim 14 wherein said selective means includes means for receiving the signal from both offset signal and detecting the best signal.

16. The system of claim 15 wherein the means for detecting the best signal includes a comparator comparing both signals and the means for selecting includes a switch for switching that is responsive to a control signal from a comparator.

17. The system of claim 10 wherein said selective means includes switching the offset subsector antenna with the best signal in the sector to the base station receiver for that sector.

18. A point multipoint communications system comprising:

a base station nodal transmitter and base station transmit antenna and a base station receiver system and base station receive antenna system located at each node, said base station transmitter and base station transmit antenna broadcasting signals over a given downstream sector of said node;

remote transceiver stations located at the downstream sector of said node capable of receiving said signals from said base station transmitter broadcasting signals over said downstream sector of said node and capable of transmitting return upstream signals at different frequencies to said base station nodal receiver system and base station receive antenna system;

said base station nodal receiver system including for each downstream sector at least two receivers with said at least two receivers adapted to receive different receive frequencies;

said base station nodal receive antenna system including for each sector at least two offset subsector antennas with one of said subsector antennas coupled to a corresponding one of at least two base station receivers and a second one of said subsector antennas coupled to a second of said two base station receivers and said offset subsector antennas are offset such that the centers of coverage of the subsector antennas is separated and offset.

19. The system of claim 18 wherein said plurality of offset subsector antennas is two and said centers of radiation are centered with a first subsector antenna adapted to receive a first band of frequencies at the left half of the downstream sector and a second subsector antenna adapted to receive a different second band of frequencies centered at the right half of the downstream sectors and said first subsector antenna is coupled to a first of said base station receivers in said sector and said second subsector antenna is coupled to a second of said base station receivers.

* * * * *